United States Patent [19]

Matsui et al.

[11] Patent Number: 4,672,163
[45] Date of Patent: Jun. 9, 1987

[54] NOZZLE FOR GAS SHIELDED ARC WELDING

[75] Inventors: Shigetomo Matsui, Higashiosaka; Shigeru Nakayama, Kobe; Hiroichi Okada, Nishinomiya; Takashi Sakurai, Kobe, all of Japan

[73] Assignee: Kawasaki Jukogyo Kabushiki Kaisha, Kobe, Japan

[21] Appl. No.: 817,748

[22] PCT Filed: Jul. 23, 1985

[86] PCT No.: PCT/JP85/00417
§ 371 Date: Dec. 11, 1985
§ 102(e) Date: Dec. 11, 1985

[87] PCT Pub. No.: WO86/00843
PCT Pub. Date: Feb. 13, 1986

[30] Foreign Application Priority Data

Jul. 24, 1984 [JP] Japan ............................... 59-153842
Feb. 20, 1985 [JP] Japan ............................... 60-32394
Feb. 20, 1985 [JP] Japan ............................... 60-22736
Jun. 12, 1985 [JP] Japan ............................... 60-127883

[51] Int. Cl.$^4$ .............................................. B23K 9/32
[52] U.S. Cl. .................................. 219/74; 219/137.43; 219/136
[58] Field of Search ............... 219/74, 75, 136, 137.2, 219/137.43, 137.52

[56] References Cited

U.S. PATENT DOCUMENTS

| 2,827,550 | 3/1958 | Unrath | 219/74 X |
| 3,536,888 | 10/1970 | Borneman | 219/137.44 |
| 3,832,513 | 8/1974 | Klasson | 219/75 |
| 4,057,704 | 11/1977 | Geus et al. | 219/75 |

FOREIGN PATENT DOCUMENTS

| 3203789 | 11/1983 | Fed. Rep. of Germany | 219/137.43 |
| 2032197 | 11/1970 | France | 219/74 |
| 51-61454 | 5/1976 | Japan | 219/137.42 |
| 57-111473 | 7/1982 | Japan | . |
| 60-92086 | 5/1985 | Japan | . |
| 1332226 | 10/1973 | United Kingdom | 219/74 |
| 582073 | 11/1977 | U.S.S.R. | 219/137.44 |

Primary Examiner—E. A. Goldberg
Assistant Examiner—C. M. Sigda
Attorney, Agent, or Firm—Leydig, Voit & Mayer

[57] ABSTRACT

A nozzle for gas shielded arc welding having a support ring to be mounted on a welding torch, a cylindrical nozzle member to be mounted on the support ring and a holddown ring for securing the nozzle member to the support ring. The nozzle member is formed of a heat-resistant non-conductive material so that spatters seldom adhere to the nozzle member. The nozzle member is fixed by being pressed against the support ring, which structure facilitates the manufacture of the nozzle member. This is useful especially as a nozzle for $CO_2$ arc welding.

14 Claims, 20 Drawing Figures

NOZZLE FOR GAS SHIELDED ARC WELDING

TECHNICAL FIELD

This invention relates to a nozzle for gas shielded arc welding which alleviates the deleterious effects of spatters produced at the time of welding by utilizing a heat-resisting non-conductive material for the nozzle.

BACKGROUND ART

A conventional nozzle for gas shielded arc welding is integrally formed of a metal, chiefly of copper, and is connected to the forward end portion of a welding torch when used. When spatters are produced by welding, they tend to adhere to the metal nozzle, and sometimes a part of the metal nozzle with high-temperature spatters adhered thereto melts and the nozzle may be easily broken. Such a damaged nozzle easily introduces further spatters. In addition, when spatters adhere to the inner surface of the nozzle, the passage of the shielded gas is narrowed, and the contact tip and the inner surface of the nozzle are apt to be bridged due to the spatters which have adhered thereto. If the contact tip and the inner surface of the nozzle are bridged, the contact tip and an object which is being welded will be short-circuited through the nozzle, inconveniently resulting in damage to the main body of the torch, not to mention the nozzle itself.

This brings about such disadvantage as the financial loss caused by damage of the apparatus and the mental pressure felt by an operator due to the need for him to constantly take into consideration the possibility of short-circuiting during a welding operation.

Furthermore, it is necessary to suspend the welding operation in order to remove the spatters which have adhered to the nozzle, this work requiring much labor since the spatters adhere fast to the nozzle.

The above-described problems are remarkably seen especially in $CO_2$ arc welding which has a strong tendency to produce spatters. In the case of utilizing $CO_2$ arc welding in the automatic welding by a robot or the like which has recently been used increasingly widely, one of the important technical problems to be solved is that the adhesion of spatters to a nozzle and damage of the apparatus caused thereby should be prevented from the viewpoint of facilitating continuous operation extending over long periods.

Japanese Utility Model Unexamined Publication No. 111473/1982 (JP-U-57/111473) discloses means for preventing spatters from adhering to the inner peripheral surface of a nozzle. That is, the inner surface of a metal nozzle is coated with a heat-resistant and nonconductive material. This device makes it difficult for spatters to adhere to the inner peripheral surface of a nozzle. However, since there is a large difference between the thermal expansion coefficient of a heat-resistant non-conductive material and that of a metal, the heat-resistant non-conductive material coated on a nozzle which is subjected to repeated thermal shock often breaks or is peeled off, thereby restricting the life of the nozzle.

It might be suggested that the entire nozzle should be formed of a heat-resistant non-conductive material such as ceramics. Ceramics are, however, easily broken when they become nicked or the like, as is known. Therefore, it is considered that a nozzle having a configuration like a conventional one formed of ceramics would have limited durability when adapted to practical use.

The present applicant proposed a nozzle which uses a ceramic nozzle member in Japanese Patent Laid-Open No. 60-200573 published on May 23, 1985. This nozzle is composed of a support ring and a ceramic nozzle member. The support ring is screwed into the forward end portion of a welding torch, and a holding claw portion having an engaging projecting portion is provided at the forward end portion of the support ring. A concave groove is provided on the outer peripheral portion of one end of the ceramic nozzle member, and the engaging projecting portion is inserted into the concave groove, whereby the nozzle member is fixed to the welding torch.

This nozzle can eliminate the above-described problems, but since it utilizes concavo-convex engagement, it is required that the nozzle member posseses high dimensional accuracy. Therefore, it disadvantageously takes a long time to produce a nozzle member, resulting in a costly nozzle member.

DISCLOSURE OF THE INVENTION

Accordingly, it is an object of the invention to provide a nozzle for gas shielded arc welding which seldom allows spatters to adhere thereto, facilitates descaling of the any spatters that should accidentally become adhered thereto, thereby preventing a short-circuit phenomenon, and which, in addition, can be manufactured at a low cost.

A nozzle according to the invention has a support ring for mounting on the forward end portion of a welding torch, a cylindrical nozzle member for mounting on the forward side of the support ring, and a means for securing the nozzle member to the support ring. The nozzle member is formed of a heat-resistant non-conductive material and secured to the support ring by pressing the nozzle member against the support ring by the securing means.

Since the nozzle member is formed of a heat-resistant non-conductive material as described above, spatters do not readily adhere to the nozzle member, and even if spatters should happen to adhere to it by some chance, they can be descaled easily. As a result, a short-circuit phenomenon between the contact tip and an object being welded is prevented, and hence the durability of the nozzle is enhanced. The average life of such a nozzle amounts to ten-odd times that of a conventional one. In addition, since it is possible to weld while the nozzle member is in contact with the object being welded, poor shielding due to the influence of wind is prevented and the arc length is maintained at a constant length, whereby operating efficiency in welding is heightened.

Furthermore, the adoption of the above-described structure does not require high dimensional accuracy, thereby providing a nozzle member at a low cost.

BEST MODE FOR CARRYING OUT THE INVENTION

Embodiments of the invention will be described in detail in the following with reference to the accompanying drawings.

Figure 1:
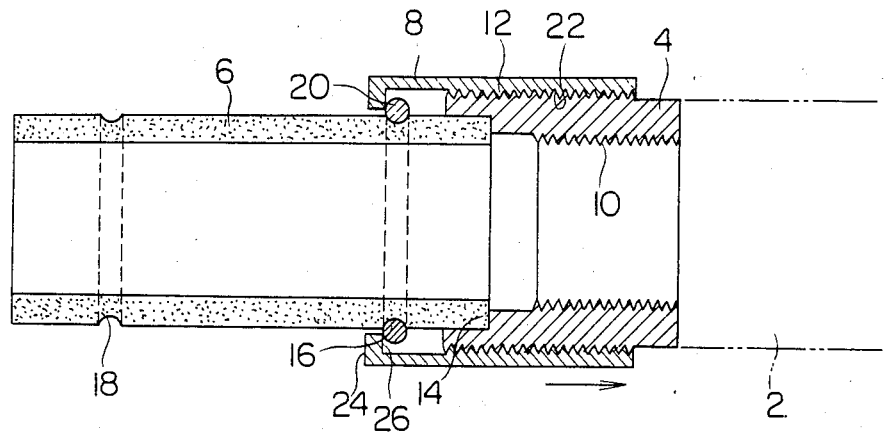
FIG. 1 is a vertical sectional view of a first embodiment of the invention.

In a first embodiment shown in FIG. 1, a nozzle for gas shielded arc welding incorporates a support ring 4 which is to be screwed into the forward end portion of a welding torch 2, a cylindrical nozzle member 6 which is to be mounted on the forward end portion of the support ring 4, and a holddown ring 8 for securing the nozzle member 6 to the support ring 4. The support ring 4 is provided with a female threaded portion 10 and a male threaded portion 12 at the inner periphery and the outer periphery respectively thereof, and the female threaded portion 10 on the inner periphery is screwed into the forward end portion of the welding torch 2. A stepped portion 14 is formed on the inner periphery of the support ring 4, and one end of the nozzle member 6 is inserted into the stepped portion 14. The stepped portion 14 may be dispensed with, and one end surface of the nozzle member 6 may be brought into contact with the forward end surface of the support ring 4. (See the embodiment shown in FIG. 7.)

Annular grooves 16, 18 having arcuate sections are provided on the outer periphery of the nozzle member in the vicinity of both end thereof. A ring spring 20 is inserted into one 16 of the annular grooves such that the outer periphery of the ring spring 20 protrudes from the outer peripheral surface of the nozzle member 6 and constitutes an annular projection. The nozzle member 6 is formed of silicon nitride (Si$_3$N$_4$) or a silicon nitride ceramic material the chief ingredient of which is silicon nitride. Alternatively, a ceramic material called SIALON may be used, which is composed of silicon (S), nitrogen (N), aluminum (Al) and oxygen (O). In this description, the silicon nitride ceramic material referred to includes SIALON. It is confirmed that silicon nitride ceramic materials are efficient in high-temperature strength, wear resistance and resistance to thermal shock, and are particularly suitable for use in a nozzle member. A test for comparing a nozzle member made of a silicon nitride ceramic masterial with one made of alumina (Al$_2$O$_3$) was carried out and it was confirmed that the nozzle member of silicon nitride is far superior in terms of the non-adherability of spatters and the ease with which spatters may be removed.

A female threaded portion 22 which is engaged with the male threaded portion 12 of the support ring 4 is provided on the inner periphery of the holddown ring 8. An annular engage portion 24 facing radially inwardly is formed on the forward end portion of the holddown ring 8, and the inner surface of the engage portion 24 which is perpendicular to the axis of the nozzle constitutes an engage surface 26 which is engaged with the ring spring 20.

Various materials may be used for the support ring 4 and the holddown ring 8, but a copper material such as copper or brass, or an aluminum alloy is suitable in that workability is good, and heat conductivity is good enough to allow the nozzle member 6 to be effectively cooled from the welding torch body side.

A nozzle for gas shielded arc welding having the above-described structure is assembled according to the following steps. The female threaded portion 10 of the support ring 4 is first screwed into the forward end portion of the welding torch 2, and one end portion of the nozzle member 6 is inserted into the stepped portion 14 of the support ring 4. In this state, the female threaded portion 22 of the holddown ring 8 is engaged with the male threaded portion 12 of the support ring 4. At this time, when the holddown ring 8 is rotated, the holddown ring 8 moves toward the torch 2, as is indicated by the arrow in FIG. 1, whereby the engage surface 26 also moves toward the torch 2, and comes into contact with the ring spring 20 on the nozzle member 6. If the holddown ring 8 is rotated further, the nozzle member 6 is pressed against the support ring 4 through the ring spring 20, and is fixed in the state wherein the one end of the nozzle member 6 is pressed against the support ring 4 in the stepped portion 14 thereof.

The above-described structure does not require the nozzle member 6 to be finished with high dimensional accuracy. In other words, it is unnecessary to very precisely determine the distance between the annular groove 16 and the one end surface of the nozzle member. It is also unnecessary to determine the depth of the annular groove at high precision. This fact facilitates the manufacture of the nozzle member 6.

The annular groove 18 at the other end side of the nozzle member 6 is provided in order to enable the reuse of the nozzle member by reversing it when the end portion which is closer to the arc of the nozzle member 6 becomes worn. Needless to say the annular groove 18 may be dispensed with, if desired.

Figure 2:
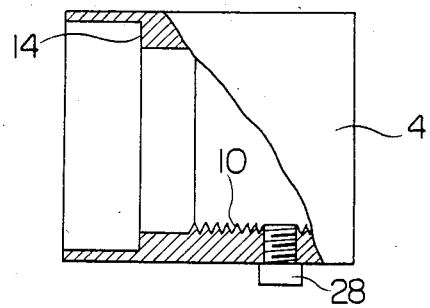
FIG. 2 is a partially cutaway side elevational view of the support ring of a second embodiment.
Figure 3:
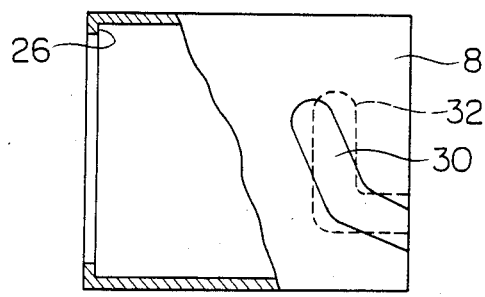
FIG. 3 is a partially cutaway view of the holddown ring of the second embodiment.

FIGS. 2 and 3 show a second embodiment in which the support ring 4 and the holddown ring 8 of the embodiment shown in FIG. 1 are modified. In this embodiment, a columnar projection 28 is provided on the outer periphery of the support ring 4, while a guide groove 30 which receives the projection 28 is provided on the holddown ring 8. The engagement of the guide groove 30 with the projection 28 secures the nozzle member 6 to the support ring 4, as is the case with the embodiment shown in FIG. 1. The guide groove 30 is inclined in relation to the axis of the nozzle. It is also possible to form a guide groove 32 in an L-shape, as is indicated by the broken line in FIG. 3. Alternatively, it is possible to fix the nozzle member 6 by utilizing the elasticity of a spring (not shown) attached to the projection 28.

Figure 4:
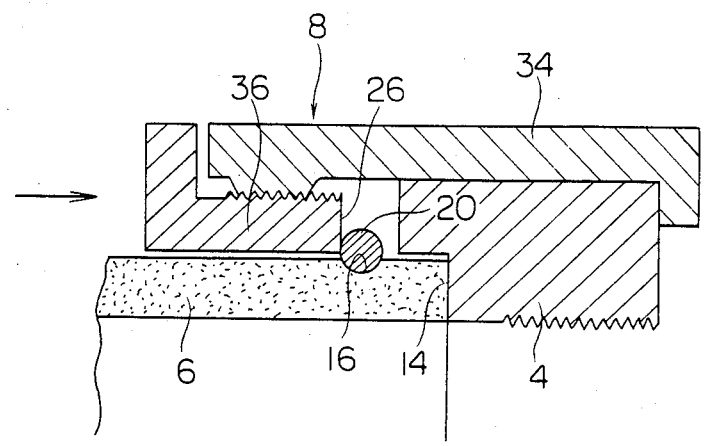
FIG. 4 is a partially vertical sectional view of a third embodiment of the invention.

A third embodiment is shown in FIG. 4 in which the support ring 4 and the holddown ring 8 of the embodiment shown in FIG. 1 are modified. In this embodiment the holddown ring 8 is composed of an outer ring 34 which is rotatably supported by the outer peripheral surface of the support ring 4, and an inner ring 36 which is screwed into the inner periphery of the forward end of the outer ring 34. Rotation of the outer ring 34 or the inner ring 36 moves the inner ring 36 in the direction of the arrow, whereby the engage surface 26 of the inner ring 36 presses against the ring spring 20.

Figure 5:
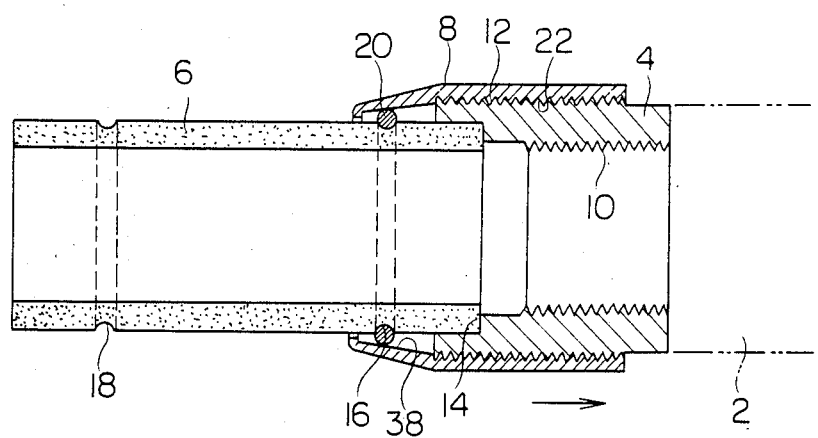
FIG. 5 is a vertical sectional view of a fourth embodiment of the invention.

FIG. 5 shows a fourth embodiment in which the engage surface 26 of the holddown ring 8 of the embodiment shown in FIG. 1 is modified. This embodiment has a tapered engage surface 38 on the holddown ring 8. This tapered engage surface 38 presses against the ring spring 20 and the nozzle member 6 not only in the direction of the axis but also in the radially inward direction, whereby the nozzle member 6 is fixed more stably, and it also becomes possible to constantly set the position of the axis of the nozzle member 6 at the right position.

Figure 6:
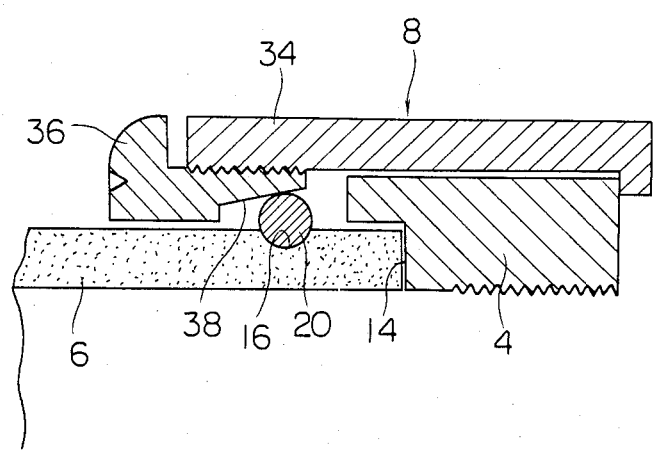
FIG. 6 is a partially vertical sectional view of a fifth embodiment of the invention.

Referring to FIG. 6, which shows a fifth embodiment in which the engage surface 26 of the inner ring 36 of the embodiment shown in FIG. 4 is modified, the nozzle member 6 is fixed by forming the tapered engage surface 38 on the inner periphery of the forward end portion of the inner ring 36 and bringing the tapered engage surface 38 into contact with the ring spring 20.

Figure 7:
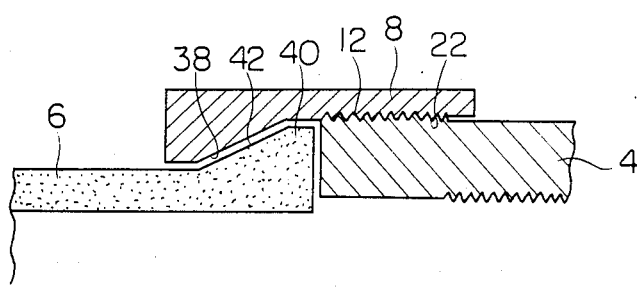
FIG. 7 is a partially vertical sectional view of a sixth embodiment of the invention.

FIG. 7 shows a sixth embodiment of the invention. A tapered annular projection 40 is integrally formed with the nozzle member 6, while the tapered engage surface 38 is formed on the inner periphery of the forward end portion of the holddown ring 8. When the holddown ring 8 is rotated, the engage surface 38 presses the tapered surface 42 of the annular projection 40 to press in both the axial and radially inward directions.

Figure 8:
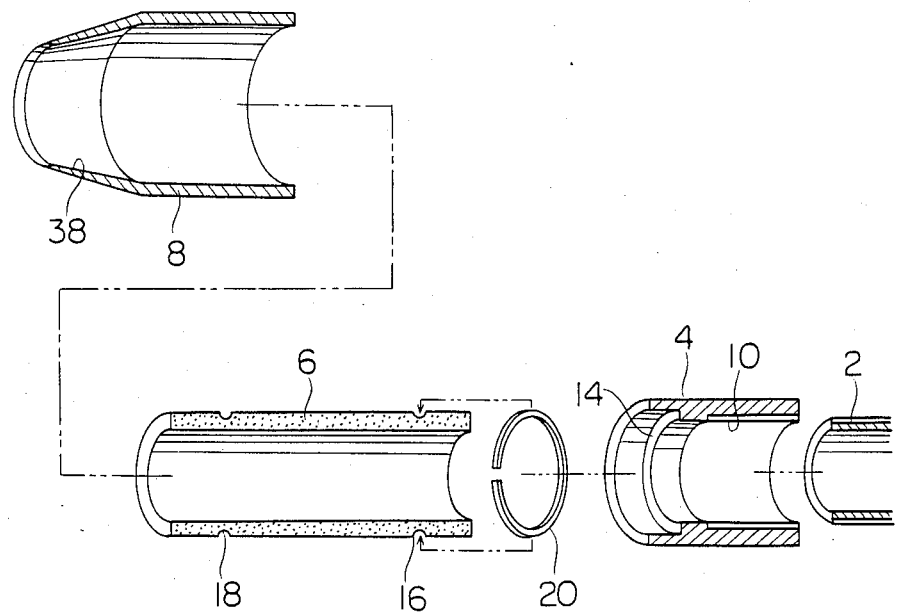
FIG. 8 is an exploded vertical sectional view of a seventh embodiment of the invention.
Figure 9:
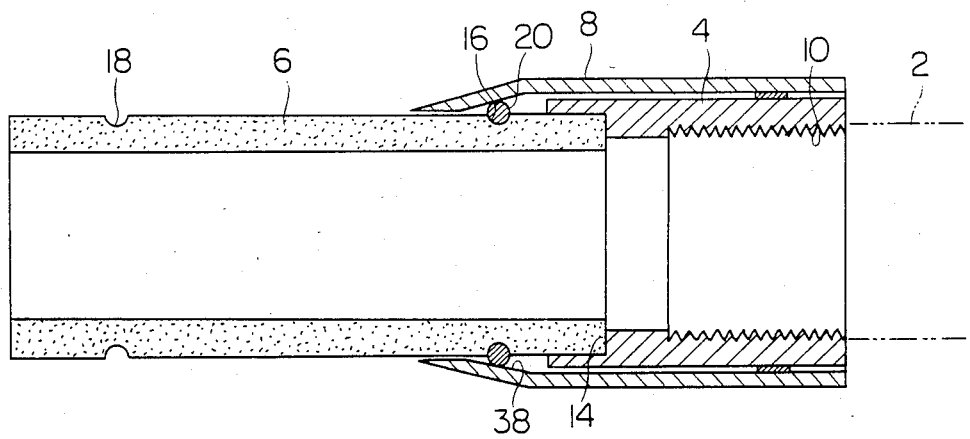
FIG. 9 is a vertical sectional view of the embodiment formed by the assembly of the parts of the embodiment shown in FIG. 8.

FIGS. 8 and 9 show a seventh embodiment of the invention. This embodiment is different from that shown in FIG. 1 in the shape of the holddown ring 8 and the means for combining the holddown ring 8 and the support ring 4. The engage surface 38 of the holddown ring 8 is tapered, and thereby presses the nozzle member 6 in the axial and radially inward directions, as is the case with the embodiments shown in FIGS. 5, 6 and 7. In order to fix the nozzle member 6, the holddown ring 8 is moved rightwardly as viewed in FIG. 9 so as to press the nozzle member 6 against the support ring 4, and in this state the holddown ring 8 and the support ring 4 are joined by spot welding. It is also possible to utilize seam welding or brazing in place of spot welding. This embodiment is convenient in terms of operation, because the support ring 4, the nozzle member 6 and the holddown ring 8 are integrally fixed, whereby all of them can be handled as one part.

Figure 10:
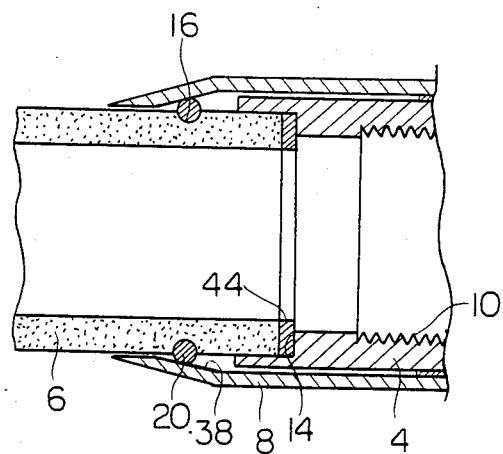
FIG. 10 is a partially vertical sectional view of an eighth embodiment of the invention.

An eighth embodiment in which a resilient member is inserted between the nozzle member 6 and the support ring 4 of the embodiment shown in FIG. 9 is shown in FIG. 10. In this embodiment, a resilient disc-shaped member 44 is provided between one end of the nozzle member 6 and the stepped portion 14 of the support ring 4. The resilient member 44 is a leaf spring in this embodiment but may also be formed of silicone rubber. The nozzle member 6 is secured to the support ring 4 stably with the aid of the resilient force of the resilient member 44. In addition, an error of dimensional accuracy of the nozzle member 6 and the support ring in the axial direction is tolerated by virtue of the resilient member 44.

Figure 11:
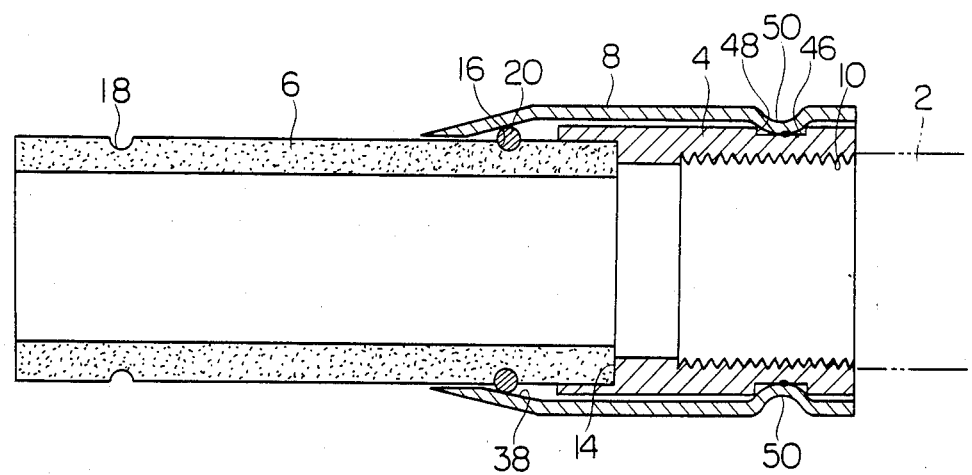
FIG. 11 is a vertical sectional view of a ninth embodiment of the invention.

FIG. 11 illustrates a ninth embodiment in which the holddown ring 8 and the support ring 4 of the embodiment shown in FIG. 9 is modified. In this embodiment, an annular groove 46 having a rectangular section is provided on the outer periphery of the support ring 4 at the end thereof which is toward the welding torch 2. A stepped portion 48 on the left side of the annular ring, namely the stepped portion 48 which faces the welding torch 2, is useful for securing the holddown ring 8 to the support ring 4. When the nozzle member 6 is secured to the support ring 4, the holddown ring 8 is first moved toward the welding torch 2. The holddown ring 8 is next pressed radially inwardly at the position corresponding with the annular groove 46 of the support ring 4 while one end of the nozzle member 6 is pressed against the stepped portion 14 of the support ring 4, whereby deformed portions 50 are formed. This deformation operation is carried out by spot welding. That is, the deformed portions are formed simultaneously with spot welding by pressing a spot welding electrode against the outer periphery of the holddown ring 8. The fixture of the holddown ring 8 and the support ring 4 is secured both by spot welding of the deformed portions 50 and the annular ring 46 and by the engagement of the deformed portions 50 with the stepped portion 48.

It is also possible to form the deformed portion 50 by a method other than spot welding. That is, a mere mechanical deformation of the holddown ring enables the holddown ring 8 and the support ring 4 to be combined. Any number of deformed portions 50 may be employed being appropriately selected according to circumstances.

Figure 12:
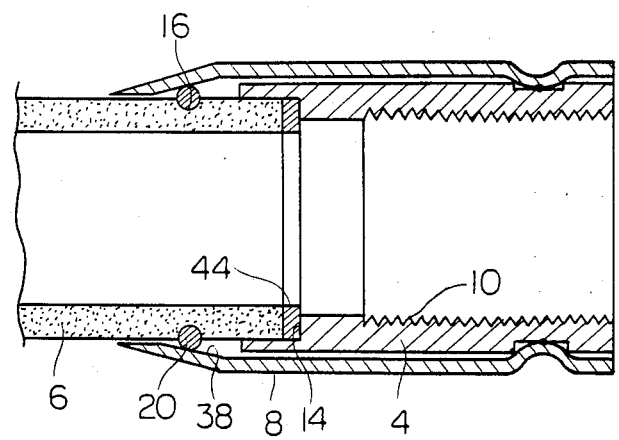
FIG. 12 is a partially vertical sectional view of a tenth embodiment of the invention.

FIG. 12 shows a tenth embodiment in which a resilient member 44 is inserted between the nozzle member 6 and the support ring 4 of the embodiment shown in FIG. 11. This embodiment corresponds to the one shown in FIG. 10, and is different from it only in the combination of the deformed portions 50 and the annular groove 46.

Figure 13:
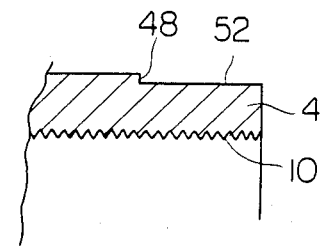
FIGS. 13 to 16 are respectively partially vertical sectional views of first to fourth modifications of the support ring of the embodiment shown in FIG. 11.

FIG. 13 illustrates a first modification of the support ring 4 shown in FIG. 11. A smaller-diameter portion 52 is formed at the end portion of the support ring 4 facing the welding torch 2. The stepped portion 48 of the smaller-diameter portion 52 prevents the deformed portion 50 of the holddown ring 8 from slipping off.

Figure 14:
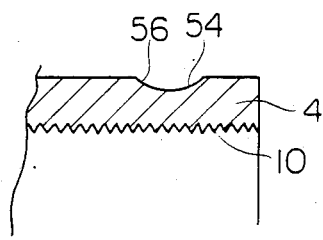

FIG. 14 shows a second modification of the support ring 4 shown in FIG. 11. An annular groove 54 having an arcuate section is formed on the outer periphery of the support ring 4 in place of the annular groove 46 having a rectangular section shown in FIG. 11. An inclined surface 56 on the left side of the annular groove 54 prevents the deformed portion 50 of the holddown ring 8 from slipping off.

Figure 15:
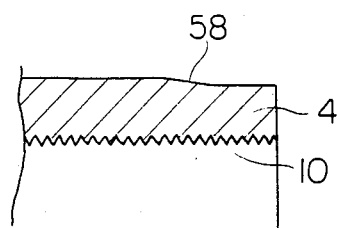

Referring to FIG. 15, which shows a third modification of the support ring 4 shown in FIG. 11, a tapered surface 58 is formed in the vicinity of the end portion of the support ring 4 facing the welding torch 2. This tapered surface 58 prevents the deformed portions 50 of the holddown ring 8 from slipping off.

Figure 16:
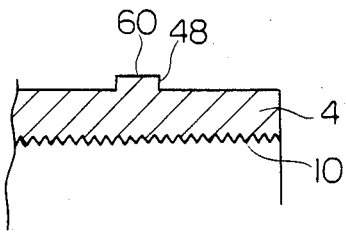

A fourth embodiment of the support ring 4 shown in FIG. 11 is shown in FIG. 16. An annular projection 60 having a rectangular section is formed on the outer periphery of the support ring 4 in place of the annular groove 46 shown in FIG. 11. The stepped portion 48 on the right side of the annular projection 60 prevents the deformed portions 50 of the holddown ring 8 from slipping off.

Incidentally, the stepped portion or the like which is formed on the outer periphery of the support ring 4 is not limited to the modifications shown in FIGS. 13 to 16, and any modification that prevents the deformed portions 50 of the holddown ring 8 from slipping off is possible. It is in order to facilitate the manufacture of the support ring 4 that the stepped portion 48 is formed to extend over the entire outer periphery of the support ring 4. It is therefore also possible to form the stepped portion 48 solely at the positions where the deformed portions 50 are formed.

Figure 17:
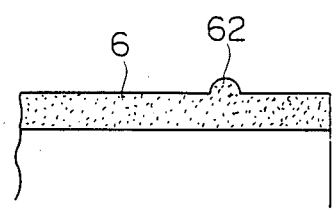
FIGS. 17 to 19 are partially vertical sectional views of first to third modifications of the nozzle member of the embodiment shown in FIG. 11.
Figure 18:
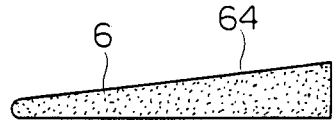
Figure 19:
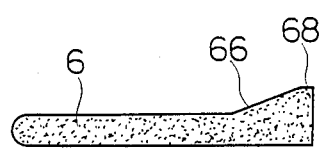

FIGS. 17 to 19 show first to third modifications of the nozzle member 6 shown in FIG. 11. In FIG. 11, the annular projection is formed by inserting the ring spring 20 into the annular groove 16 of the nozzle member 6. This structure facilitates the manufacture of the nozzle member 6. It is, however, also possible to provide the annular projection integrally with the nozzle member 6. In FIG. 17 an annular projection 62 having a semicircular section is formed integrally with the nozzle member 6. In FIG. 18, the entire nozzle member 6 is tapered, and the tapered surface 64 of the nozzle member 6 facing the welding torch 2 is utilized as an annular projection. In FIG. 19 a projecting portion 68 having a tapered surface 66 is formed at one end of the nozzle member 6.

Figure 20:
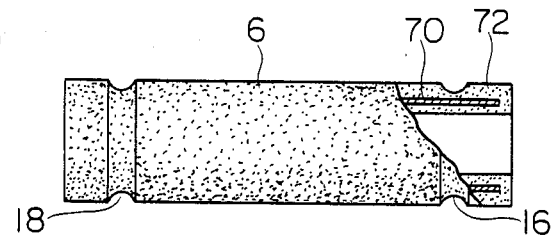
FIG. 20 is a partially cutaway side elevational view of a fourth modification of the nozzle member of the embodiment shown in FIG. 20.

FIG. 20 illustrates a fourth modification of the nozzle member 6 shown in FIG. 11. The nozzle member 6 is provided with ceramic layer 72 formed on the inner and outer surfaces of a metal tube 70 by spraying or the like.

It is possible to combine the first to tenth embodiments and their modifications in various ways. For example, the nozzle members shown in FIGS. 17 to 19 can be utilized for the embodiment shown in FIGS. 6, 7, 9, 10 and 12, and the nozzle member 6 shown in FIG. 20 may be utilized for all the embodiments described above.

INDUSTRIAL APPLICABILITY

A nozzle for gas shielded arc welding according to the invention is useful when employed as an attachment for a torch especially in the case of $CO_2$ gas shielded arc welding.

What is claimed is:

1. A nozzle for a gas shielded arc welding torch comprising:
   a support ring for mounting on a forward end portion of the welding torch;
   a cylindrical nozzle member formed of heat-resistant non-conductive material mounted on a forward end of said support ring, said nozzle member having an annular groove formed on an outer periphery of one end portion thereof;
   a split ring spring locked in the annular groove and projecting outwardly from the outer peripheral surface of said nozzle member;
   means for securing said nozzle member to said support ring; and
   said securing means including a holddown ring mounted on the forward portion of said support ring to extend forwardly in surrounding relation with the outer periphery of the one end of said nozzle member including the annular groove and said split ring spring and having an engaging surface which engages with a forward surface of said split ring spring on said nozzle member to press said nozzle member against said support ring.

2. A nozzle according to claim 1, wherein the engaging surface of said holddown ring is composed of a surface perpendicular to an axis of said nozzle.

3. A nozzle according to claim 1, wherein the engaging surface of said holddown ring is composed of a tapered surface concentric with an axis of said nozzle.

4. A nozzle according to claim 1 wherein said holddown ring has a female theaded portion provided in an inner peripheral surface of said holddown ring, and said support ring has a male threaded portion which engages said female threaded portion of said holddown ring on an outer peripheral surface for connecting said holddown ring to said support ring.

5. A nozzle according to claim 1, wherein said holddown ring has an outer ring and an inner ring, an inner peripheral surface of one end portion of said outer ring is rotatably engaged with an outer peripheral surface of said support ring, while a female threaded portion is provided on an inner peripheral surface of the other end portion of said outer ring, and said inner ring has said engaging surface and a male threaded portion which engages with said female threaded portion of said outer ring.

6. A nozzle according to claim 1 wherein said holddown ring is provided with guide grooves which open to one end surface of said holddown ring, and a columnar projection to be inserted into said guide grooves is provided on an outer periphery of said support ring for connecting said holddown ring to said support ring.

7. A nozzle according to claim 6 wherein said guide groove is inclined in relation to an axis of said nozzle.

8. A nozzle according to claim 6 wherein said guide groove is formed in an L-shape.

9. A nozzle according to claim 1, wherein said holddown ring is spot welded to said support ring.

10. A nozzle according to claim 9 wherein a stepped portion facing the welding torch is formed on an outer peripheral surface of said support ring, and a deformed portion which engages with said stepped portion is formed by deformation of said holddown ring.

11. A nozzle according to claim 1 wherein a disc-shaped resilient member is located between said nozzle member and said support ring to provide a force-exerting member.

12. A nozzle according to claim 10 wherein a disc-shaped resilient member is located between said nozzle member and said support ring to provide a force-exerting member.

13. A nozzle according to claim 1 wherein said nozzle member is formed of a silicon nitride ceramic material.

14. A nozzle according to claim 1 wherein said nozzle member is formed of a metal tube with a layer of heat-resistant non-conductive material formed by spraying the same on inner and outer surfaces of said metal tube.

* * * * *